Patented Feb. 20, 1923.

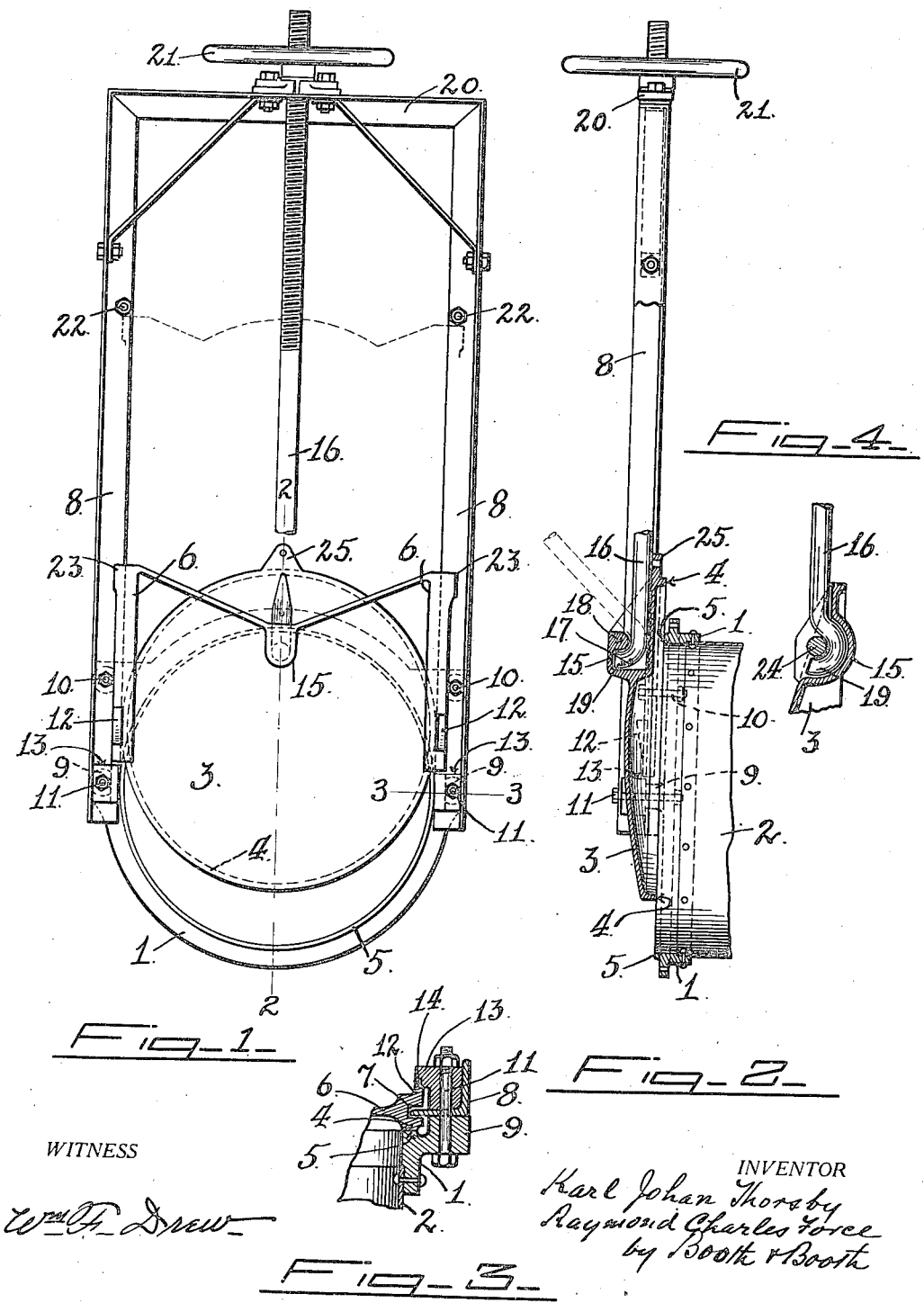

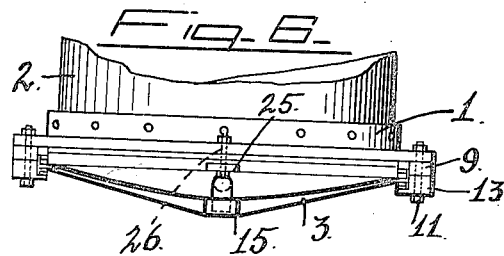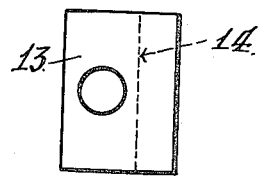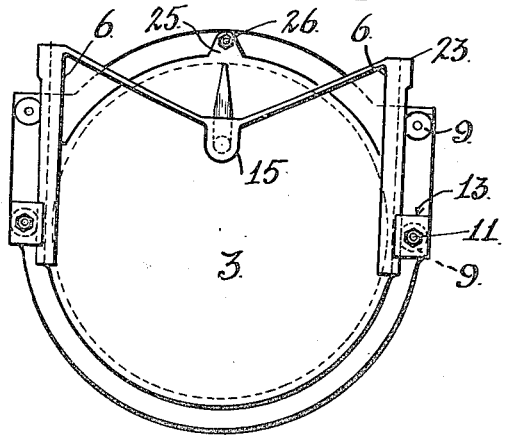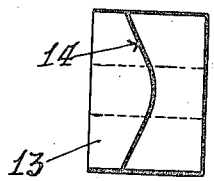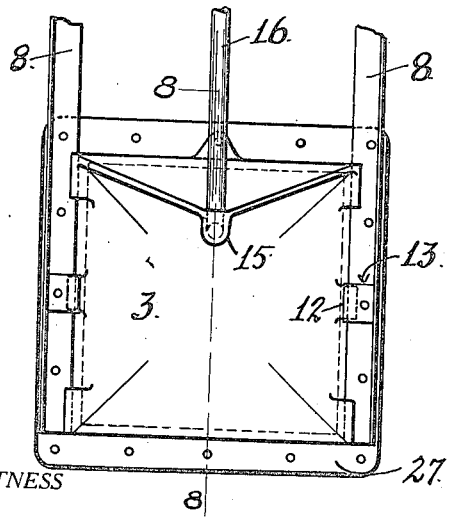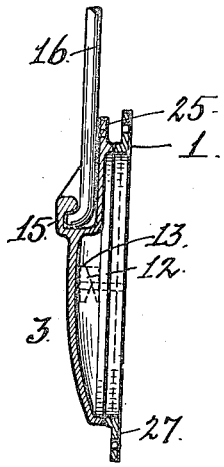

1,445,921

UNITED STATES PATENT OFFICE.

KARL JOHAN THORSBY AND RAYMOND CHARLES FORCE, OF OAKLAND, CALIFORNIA, ASSIGNORS TO CALIFORNIA CORRUGATED CULVERT COMPANY, OF OAKLAND, CALIFORNIA, A CORPORATION OF CALIFORNIA.

SLIDE HEAD GATE.

Application filed August 1, 1921. Serial No. 488,878.

*To all whom it may concern:*

Be it known that we, KARL JOHAN THORSBY and RAYMOND CHARLES FORCE, citizens of the United States, residing at Oakland, in the county of Alameda and State of California, have invented certain new and useful Improvements in Slide Head Gates, of which the following is a specification.

Our invention relates to that class of water-gates commonly known, from their direction of movement, as slide-headgates.

One object of our invention is to provide a gate which is simple and economical in its manufacture.

Another object is to provide a gate which may be shipped partly assembled, and in such manner as to eliminate crating and boxing, and which also may be attached to a pipe before leaving the factory, a feature of great advantage in the installation of the gate.

Another object is to provide a gate which may be easily put together and taken apart by unskilled labor.

A still further object is to provide a gate which is easy to operate and dependable in its functions.

With these objects in view, our invention consists in the novel slide-headgate, which we shall hereinafter fully describe by reference to the accompanying drawings in which:—

Figure 1 is a front elevation of our gate showing the cover member partly elevated.

Figure 2 is a side view of the same, partly in section, on the line 2—2 of Fig. 1.

Figure 3 is a section on the line 3—3 of Fig. 1.

Figure 4 is a detail showing a modification in the connection between the lifting member and the gate cover.

Figure 5 is a front view of the gate cover and the gate seat-ring showing these parts assembled ready for shipment.

Figure 6 is a top view of Fig. 5.

Fig. 7 is a front elevation of our gate when made of rectangular contour, adapted for attachment to a wall or bulkhead.

Figure 8 is a section on the line 8—8 of Fig. 7.

Figures 9 and 10 are detailed views of the wedge-block 13.

In the drawings like numerals indicate similar parts in the different views. The gate seat-ring 1 is attached to a pipe 2 and is, for convenience only, shown riveted to an iron pipe. 3 is the gate cover. It is provided with a machine finished face 4, which makes contact with a similar machine finished face 5 on gate seat-ring 1.

The gate cover 3 is also provided with two wings 6, one on each side, said wings having grooves or slots 7 (see Fig. 3). The grooves 7 engage guide members 8 which are, for convenience, shown as angle irons. The gate seat-ring 1 is provided with bosses 9 which project beyond the plane of the machine finished face 4 of the cover 3 in such relation that when the guide members 8 are placed on the bosses 9, one leg of said members 8 will fit in the slots 7 on the gate cover, as shown in Fig. 3.

The guide members 8 and bosses 9 are provided with corresponding bolt holes to receive bolts 10 and 11. Bolts 10 and 11 will, when screwed tight, keep the guide members 8 in a fixed relation to gate cover 3.

The gate cover 3 is provided with wedge members 12 as shown in Figs. 2 and 3. The wedge members 12 engage wedge blocks 13, and the relation between wedge members 12 and wedge blocks 13 is such as to press and hold the faces 4 and 5 tightly together when the gate cover 3 is in a closed position, thereby making a watertight connection between the gate seat-ring 1 and the gate cover 3.

The wedge blocks 13 are held in position by the clamping bolts 11, thereby dispensing with separate rivets or bolts to hold said wedge blocks in position, which is the general practice. The wedge blocks 13 are provided with a lip 14 which engages the wedge members 12. Lips 14, as seen in Figs. 9 and 10, have the shape of a double wedge which is symmetrically disposed on either side of the center of the bolt hole. The reason for this is to provide a wedge block which may be used equally well on either side of the gate, thereby avoiding the necessity of having separate left and right members which are liable to create confusion.

Another advantage is that when the wedge blocks 13 become worn from prolonged use, it is only necessary to loosen the bolts 11 and change the left wedge block over to the right, and vice versa.

The gate cover 3 is provided with a pocket 15 which receives the lower end of the lifting rod 16 which is bent to a hook shape 19 having a radius 17, see Fig. 2. The pocket 15 is provided with a tongue 18, having a radius concentric to radius 17 on rod 16. The bent end 19 may be inserted into pocket 15 by starting the rod in an inclined position, as is clearly indicated by dotted lines, Fig. 2. After the rod 16 is placed in a perpendicular position, the bent end 19 is confined in the pocket 15 and when the lifting rod 16 is being raised, the upper side of the bent end 19 engages the tongue 18, thereby raising and opening the gate cover 3, and when the lifting rod 16 is lowered, the under side of the bent end 19 pushes against the bottom of the pocket 15, thereby forcing the gate cover 3 down to a closed position. Fig. 4 shows a slight modification of the pocket 15, in which a pin 24 takes the place of the solid tongue 18.

The guide members 8 are extended to any suitable height and are provided with a bridge or cross member 20. Cross member 20 acts as a suitable support for the means for operating the lifting rod 16.

In the drawing Figs. 1 and 2, a handwheel 21 is, for convenience, shown as a suitable operating means, though a number of other devices will work equally as well.

The guide members 8 are provided with stop bolts 22 which are so placed as to act as stops against the projections 23 on gate cover 3 when said gate cover 3 is raised to full opening, as shown by the dotted line in Fig. 1; thereby preventing the faces 4 and 5 from becoming disengaged.

Figs. 5 and 6 show the main elements of the gate as these appear when being shipped. The essential feature lies in the fact that the clamping bolts 11 serve as a means for keeping the gate cover 3 securely against gate seat-ring 1. It will be noted that since the guide members 8 are removed and shipped separately, the wedge blocks 13 may be cinched tightly against the wedge members 12 by tightening up on the bolts 11.

The gate cover 3 is provided with a lug 25 located at its top edge. A bolt 26, Figs. 5 and 6, extends through the gate seat-ring 1 and the lug 25 for the purpose of preventing the gate cover 3 from sliding out of position, if it should be subjected to blows or rough handling while being shipped. It will also be noted that the faces 4 and 5 are absolutely protected against any injury from rough handling, and thus the cover and seat-ring may very readily be shipped without any crating or boxing, requiring only the one extra bolt 26, as the other bolts 11 are the same as are used in the assembled gate.

In Figs. 7 and 8 are shown a modified construction of our water gage, the opening being rectangular. A flange 27 is provided for the purpose of fastening the gate ring 1 to a wall or bulkhead. Of course any other form or shape may be used and still be within the scope of this invention.

We claim:—

1. A slide-headgate comprising a gate seat-member; a reciprocative gate cover-member having a wedge; a wedge block co-acting with the wedge of the cover-member; and a bolt connecting the wedge-block with the gate seat-member, adapted to tighten and hold the seat and cover members together when packed for shipment.

2. A slide-headgate comprising a gate seat-member; a reciprocative gate cover-member having a wedge; a wedge block co-acting with the wedge of the cover-member; a bolt connecting the wedge-block with the gate seat-member, adapted to tighten and hold the seat and cover-members together when packed for shipment, and a bolt for temporarily connecting the upper portion of said seat and cover-members when so packed.

3. A slide-headgate comprising a gate-seat-member having at each side a boss; a guide member and wedge block secured in common by a bolt to each boss; a gate cover-member having side-wings slidably grooved upon the guide members and having wedges co-acting with the wedge-blocks to effect a tight joint between the adjacent faces of said cover-member and said seat-member; and means for reciprocating said cover-member.

4. A slide-headgate comprising a gate seat-member; a guide-member secured to said member; a reciprocative gate cover-seat-member; member slidably fitted upon said guide; and a wedge block removably secured to the seat-member and co-acting with the wedge of the cover-member to make a tight-joint between the adjacent faces of the cover and seat members, said wedge block having complemental wedging surfaces adapting it for reversal and for right or left.

In testimony whereof we have signed our names to this specification.

KARL JOHAN THORSBY.
RAYMOND CHARLES FORCE.